US011971837B2

(12) United States Patent
Liu et al.

(10) Patent No.: US 11,971,837 B2
(45) Date of Patent: Apr. 30, 2024

(54) PROCESSOR INTERFACE ASSEMBLY, OPERATION METHOD, AND PROCESSOR

(71) Applicant: Phytium Technology Co., Ltd., Tianjin (CN)

(72) Inventors: Fudong Liu, Tianjin (CN); Cai Chen, Tianjin (CN); Lizheng Fan, Tianjin (CN); Xiaofan Zhao, Tianjin (CN)

(73) Assignee: PHYTIUM TECHNOLOGY CO., LTD., Tianjin (CN)

( * ) Notice: Subject to any disclaimer, the term of this patent is extended or adjusted under 35 U.S.C. 154(b) by 39 days.

(21) Appl. No.: 17/575,525

(22) Filed: Jan. 13, 2022

(65) Prior Publication Data

US 2022/0229799 A1    Jul. 21, 2022

(30) Foreign Application Priority Data

Jan. 15, 2021    (CN) .......................... 202110053414.0

(51) Int. Cl.
*G06F 13/40*    (2006.01)
*G06F 13/42*    (2006.01)

(52) U.S. Cl.
CPC ...... *G06F 13/4068* (2013.01); *G06F 13/4282* (2013.01); *G06F 2213/40* (2013.01)

(58) Field of Classification Search
None
See application file for complete search history.

(56) References Cited

U.S. PATENT DOCUMENTS

| 6,721,839 | B1* | 4/2004 | Bauman | G06F 13/404 |
| | | | | 710/305 |
| 7,370,310 | B1* | 5/2008 | Saini | G06F 30/34 |
| | | | | 716/128 |
| 7,737,725 | B1* | 6/2010 | Ansari | G06F 15/7867 |
| | | | | 713/100 |
| 11,366,776 | B1* | 6/2022 | Zhai | G06F 13/4282 |
| 2018/0144145 | A1* | 5/2018 | Pearson | G06F 21/606 |
| 2019/0036874 | A1* | 1/2019 | Sun | H04L 12/40019 |

FOREIGN PATENT DOCUMENTS

| CN | 1811744 A | 8/2006 |
| CN | 101710314 A | 5/2010 |
| CN | 109902038 A | 6/2019 |
| JP | 2005062997 A | 3/2005 |

OTHER PUBLICATIONS

European Search Report for EP4030305 dated Jun. 14, 2022, 10 pages (Year: 2022).*
Chinese Office Action for CN 202110053414 dated Apr. 12, 2022, 6 pages (Year: 2022).*

* cited by examiner

*Primary Examiner* — Idriss N Alrobaye
*Assistant Examiner* — Dayton Lewis-Taylor
(74) *Attorney, Agent, or Firm* — ANOVA LAW GROUP, PLLC

(57) ABSTRACT

A processor interface assembly includes: a first interface circuit including a plurality of sub-interface circuits and configured to couple with a plurality of peripheral devices, wherein the plurality of peripheral devices is configured to occupy a pre-determined address space, and the pre-determined address space includes multiple sub-address spaces; and a controller including a register and configured to set a sub-address space occupied by at least one type of peripheral devices among the plurality of peripheral devices based on at least a portion of data stored in the register.

18 Claims, 3 Drawing Sheets

PROCESSOR INTERFACE ASSEMBLY, OPERATION METHOD, AND PROCESSOR

CROSS-REFERENCE TO RELATED APPLICATION

This application claims priority to Chinese Patent Application No. 202110053414.0, filed on Jan. 15, 2021, the entire content of which is incorporated herein by reference.

TECHNICAL FIELD

The present disclosure relates to the technical field of processor technology and, more particularly, to a processor interface assembly, an operation method thereof, and a processor.

BACKGROUND

A processor includes an interface assembly and a processor core. The interface circuit includes a controller, a first interface circuit, and a second interface circuit. The first interface circuit may be coupled to a plurality of peripheral devices through a first bus. The second interface circuit may be coupled to the processor core through a second bus. For example, the plurality of peripheral devices occupies a pre-determined address space. The processor core can access a target peripheral device through the interface assembly thereof based on an address space occupied by the target peripheral device that requests access. For example, the first bus may be a low pin count (LPC) bus, and the second bus may be an advanced peripheral bus (APB).

The LPC bus is a 33 MHz 4-bit parallel bus protocol based on an Intel standard for replacing a previous industry standard architecture (ISA) bus. The APB bus is a peripheral interconnection bus defined by Advanced Microcontroller Bus Architecture (AMBA) bus protocol specification. The APB bus is often used to connecting peripheral interfaces. The APB bus provides a low power consumption APB interface. The low power consumption APB interface is often used to connect peripheral devices that have low bandwidth and do not require a high-performance bus.

SUMMARY

One aspect of the present disclosure provides a processor interface assembly. The processor interface assembly includes: a first interface circuit including a plurality of sub-interface circuits and configured to couple with a plurality of peripheral devices, wherein the plurality of peripheral devices is configured to occupy a pre-determined address space, and the pre-determined address space includes multiple sub-address spaces; and a controller including a register and configured to set a sub-address space occupied by at least one type of peripheral devices among the plurality of peripheral devices based on at least a portion of data stored in the register.

Another aspect of the present disclosure provides a processor. The processor includes a processor interface assembly. The processor interface assembly includes: a first interface circuit including a plurality of sub-interface circuits and configured to couple with a plurality of peripheral devices, wherein the plurality of peripheral devices is configured to occupy a pre-determined address space, and the pre-determined address space includes multiple sub-address spaces; and a controller including a register and configured to set a sub-address space occupied by at least one type of peripheral devices among the plurality of peripheral devices based on at least a portion of data stored in the register.

Another aspect of the present disclosure provides an operation method of a processor interface assembly. The operation method includes: modifying at least a portion of data stored in a register to adjust a sub-address space occupied by at least one type of peripheral devices among a plurality of peripheral devices. The processor interface assembly includes: a first interface circuit including a plurality of sub-interface circuits and configured to couple with the plurality of peripheral devices, wherein the plurality of peripheral devices is configured to occupy a pre-determined address space, and the pre-determined address space includes multiple sub-address spaces; and a controller including the register and configured to set the sub-address space occupied by the at least one type of peripheral devices among the plurality of peripheral devices based on the at least a portion of data stored in the register.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Figure 1:
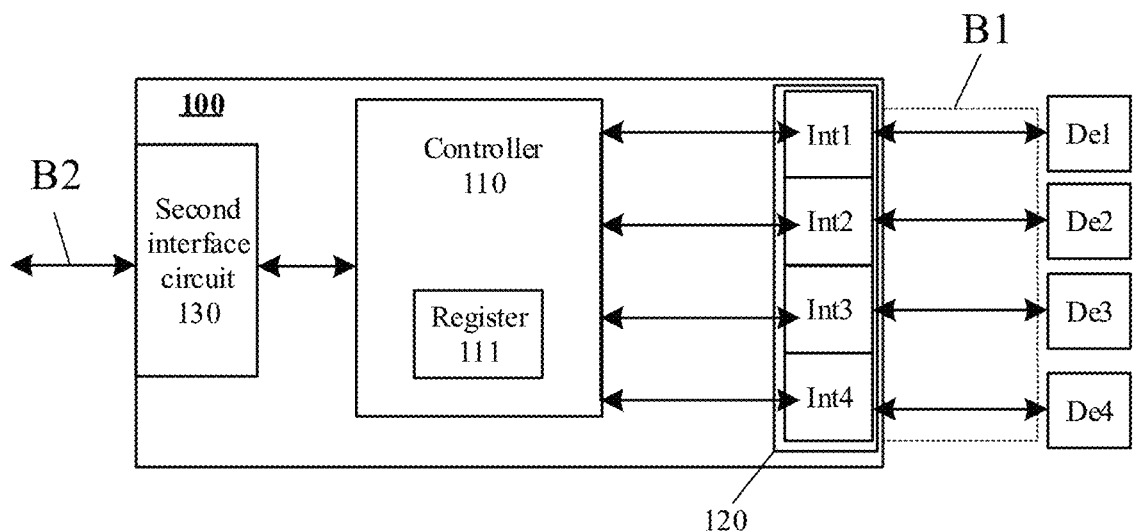
FIG. 1 illustrates a schematic block diagram of an exemplary processor interface assembly according to some embodiments of the present disclosure.

Various features and embodiments of the present disclosure are described in detail below with reference to the accompanying drawings. In the description below, numerous specific details are proposed to provide a comprehensive understanding of the present disclosure. However, for those skilled in the art, the present disclosure may be implemented without some of the specific details. The description of the embodiments below is intended to provide a better understanding of the present disclosure through examples. In the drawings and the specification below, certain well-known structures and technical details are not shown to avoid unnecessary ambiguity. For clarity, dimensions of certain structures may be expanded to show structural details. In addition, the features, structures, or characteristics described below may be combined in one or more embodiments in any suitable manner.

In the description of the present disclosure, it should be noted that, unless otherwise specified, "plurality" means two or more. The orientation or position relationship indicated by terms "upper," "lower," "left," right," inner," and "outer" are only for the convenience and simplification of describing the present disclosure, do not indicate or imply that a device or an element referred herein must have a specific orientation or must be constructed and operated in a specific orientation, and hence cannot be construed as limiting the present disclosure. In addition, terms "first" and "second" are only used for illustration purpose, and cannot be construed as indicating or implying relative importance.

Words appeared in the description below for describing directions refer to directions in the drawings, and do not limit a specific structure of the embodiments of the present disclosure. In the description of the present disclosure, it should be noted that, unless otherwise clearly specified and limited, terms "installation" and "connection" should be interpreted in a broad sense. For example, the terms may refer to a fixed connection, a detachable connection, or an integral connection. The connection may be direct or indirect. For those of ordinary skill in the art, the specific meaning of the above-mentioned terms in the specification can be interpreted according to specific circumstances.

It is observed that various types of peripheral devices for different types of processors occupy different address spaces. When a program (e.g., a low-level program) developed for a first type of processors is applied to a second type of processors, addresses occupied by all types of peripheral devices involved in program developed for the first type of processors need to be modified, thereby increasing development workload. For example, the different types of processors can be processors with different architectures, such as processors with an X86 (compute language instruction set executed by a microprocessor) architecture and processors with an advanced reduced instruction set machine (Advanced RISC machine or ARM) architecture.

The present disclosure provides a processor interface assembly, an operation method thereof, and a processor. The processor interface may also be referred to as an interface circuit. The processor interface assembly includes: a first interface circuit and a controller. The first interface circuit includes a plurality of sub-interface circuits configured to couple with a plurality of peripheral devices respectively. The controller includes a register configured to set a sub-address space occupied by at least one type of the plurality of peripheral devices based on at least part of data stored in the register.

For example, by setting the register in the controller of the processor interface assembly, the sub-address space occupied by at least one type of the plurality of peripheral devices can be set based n at least part of the data stored in the register. As such, when the program (e.g., low level program) developed for the first type of processors is applied to the second type of processors, and the sub-address space occupied by at least one type of the plurality of peripheral devices can be set by setting at least part of the data stored in the register, such that the sub-address space occupied by the at least one type of the plurality of peripheral devices matches the second type of processors, thereby reducing the development workload.

The processor interface assembly is described below in a non-limiting manner through embodiments and examples. As described below, under circumstances of no conflict, the specific embodiments and examples can be combined with each other to obtain additional embodiments and examples, which also fall within the scope of the present disclosure.

FIG. 1 illustrates a schematic block diagram of an exemplary processor interface assembly 10 according to some embodiments of the present disclosure.

In some embodiments, the processor interface assembly 100 includes a low pin count (LPC) interface circuit. For example, the LPC interface circuit provides operation modes such as an interrupt mode and a read-write mode. A register configured in the processor interface assembly 100 can be used to support the read-write mode of the LPC interface circuit.

As shown in FIG. 1, the processor interface assembly 100 includes a first interface circuit 120 (e.g., the LPC interface circuit) and a controller 110 (e.g., an LPC controller). The first interface circuit 120 includes a plurality of sub-interface circuits (e.g., Int1 to Int4). The plurality of sub-interface circuits is configured to couple with multiple types of peripheral devices (e.g., De1 to De4), respectively.

In some embodiments, as shown in FIG. 1, the plurality of sub-interface circuits (e.g., Int1 to Int4) may be coupled with the multiple types of peripheral devices through a first bus B1 (e.g., an LPC bus), respectively. As shown in FIG. 1, the first bus B1 includes four connections connecting between four sub-interface circuits (Int1, Int2, Int3, Int4) and four types of peripheral devices (De1, De2, De3, De4) respectively. Each connection is a sub-bus carrying data and addresses thereof. Thus, the first bus B1 includes four sub-buses. For example, as shown in FIG. 1, the processor interface assembly 100 further includes a second interface circuit 130. The second interface circuit 130 is configured to couple with a second bus B2 (e.g., an APB bus). For example, the second bus b2 is coupled with a processor core.

In some embodiments, the number of the plurality of sub-interface circuits is equal to the number of the types of peripheral devices supported by the processor interface assembly 100. For example, both are N, and N is a positive integer. For example, N=4.

In some embodiments, as shown in FIG. 1, the plurality of sub-interface circuits includes a first sub-interface circuit Int1, a second sub-interface circuit Int2, a third sub-interface circuit Int3, and a fourth sub-interface circuit Int4. The multiple types of peripheral devices include a first-type peripheral device De1, a second-type peripheral device De2, a third-type peripheral device De3, and a fourth-type peripheral device De4. The first sub-interface circuit Int1, the second sub-interface circuit Int2, the third sub-interface circuit Int3, and the fourth sub-interface circuit Int4 are coupled with the first-type peripheral device De1, the second-type peripheral device De2, the third-type peripheral device De3, and the fourth-type peripheral device De4, respectively, through the first bus B1.

In some embodiments, the first-type peripheral device De1, the second-type peripheral device De2, the third-type peripheral device De3, and the fourth-type peripheral device De4 can be an input/output device, a random-access memory (RAM) device, a non-volatile memory device for storing firmware, and a direct memory access (DMA) device, respectively.

The multiple types of peripheral devices are configured to occupy a pre-determined address space. The pre-determined address space includes multiple sub-address spaces. For example, the number of the multiple sub-address spaces is equal to the number of the plurality of sub-interface circuits, and is equal to the number of multiple types of peripheral devices (e.g., all are N). for example, each of the multiple types of peripheral devices occupies a corresponding sub-address space in the multiple sub-address spaces. For example, different types of peripheral devices occupy (e.g., declared to occupy) different sub-address spaces.

In some embodiments, an address occupied by each peripheral device in each type of the multiple types of peripheral devices belongs to the sub-address space occupied (e.g., declared to occupy) by each type of the multiple types of peripheral devices. For example, the address occupied by each peripheral device in each type of the multiple types of peripheral devices is sent to the second interface circuit 130 or is received from the second interface circuit 130.

Figure 2:
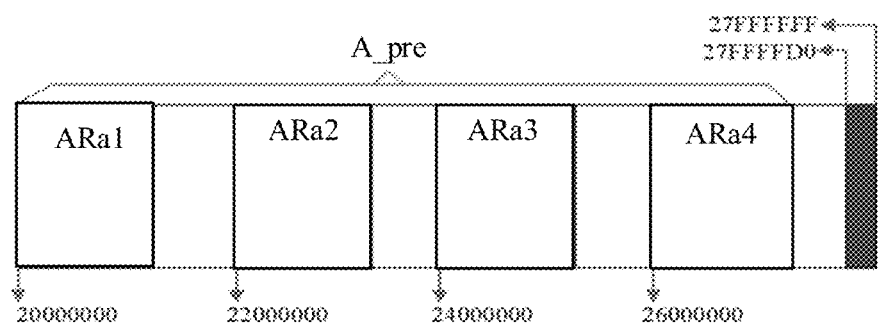
FIG. 2 illustrates a schematic diagram of a pre-determined address space according to some embodiments of the present disclosure.

FIG. 2 illustrates a schematic diagram of a pre-determined address space according to some embodiments of the present disclosure. In some embodiments, as shown in FIG. 2, when the multiple types of peripheral devices include four types of peripheral devices, the multiple sub-address spaces include a first sub-address space ARa1, a second sub-address space ARa2, a third sub-address space ARa3, and a fourth sub-address space ARa4. For example, each of the first sub-address space ARa1, the second sub-address space ARa2, the third sub-address space ARa3, and the fourth sub-address space ARa4 is a continuous address space.

In some embodiments, the processor interface assembly 100 (e.g., the LPC interface circuit of the ARM architecture) occupies an address space of 128 MB. The address space occupied by the processor interface assembly 100 can be 0x20000000-0x27FFFFFF (hexadecimal). The multiple types of peripheral devices may occupy at least a portion of the address space. For example, as shown in FIG. 2, the first sub-address space ARa1 is 0x20000000-0x21FFFFD0, the second sub-address space ARa2 is 0x22000000-0x23FFFFD0, the third sub-address space ARa3 is 0x24000000-0x25FFFFD0, and the fourth sub-address space ARa4 is 0x26000000-0x27FFFFD0. It should be noted that, ending addresses of the first sub-address space, the second sub-address space, the third sub-address space, and the fourth sub-address space given above are exemplary, and can be adjusted according to actual requirements. For example, the ending addresses of the first sub-address space, the second sub-address space, the third sub-address space, and the fourth sub-address space can be adjusted to 0x20FFFFFF, 0x22FFFFFF, 0x24FFFFFF, and 026FFFFFF, respectively. "0x" indicates that numbers succeeding "0x" are hexadecimal numbers.

In some embodiments, the multiple sub-address spaces are equal to each other. That is, a difference between the ending address and the starting address of each of the multiple sub-address spaces is equal to each other.

In some embodiments, at least one type of the multiple types of peripheral devices actually occupies an address space smaller than the address space occupied (e.g., declared to occupy) by the at least one type of the multiple types of peripheral devices.

In some embodiments, sizes of the multiple sub-address spaces are not less than a maximum size of the actually occupied address spaces. The maximum size of the actually occupied address spaces is the maximum address space of the address spaces actually occupied by the multiple types of peripheral devices. Thus, a problem that some peripheral devices are unable to occupy any address spaces can be avoided when the multiple types of peripheral devices actually occupy different sizes of the address spaces and the address spaces are exchanged.

As shown in FIG. 1, the controller 110 includes a register 111. The controller 110 is configured to set the sub-address space occupied by at least one type of the multiple types of peripheral devices (e.g., each and every type of the multiple types of peripheral devices) based on at least a portion of data stored in the register 111.

Figure 3:
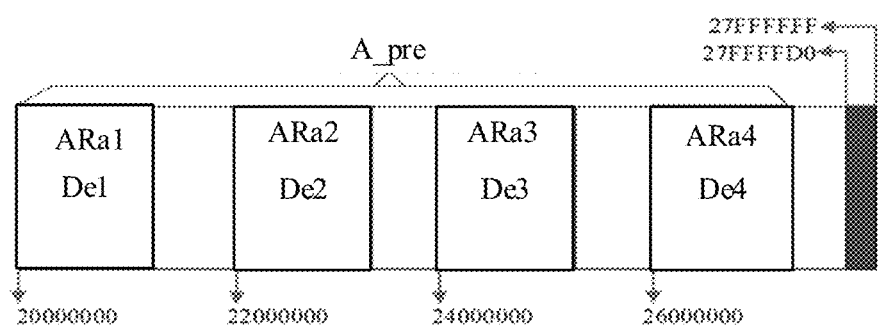
FIG. 3 and FIG. 4 illustrate schematic diagrams of four types of peripheral devices occupying four sub-address spaces according to some embodiments of the present disclosure.
Figure 4:
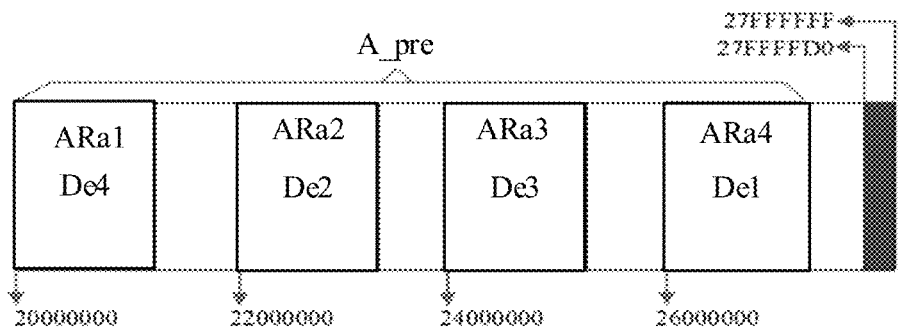

FIG. 3 and FIG. 4 illustrate schematic diagrams of four types of peripheral devices occupying four sub-address spaces according to some embodiments of the present disclosure.

In some embodiments, as shown in FIG. 3, the at least a portion of the data stored in the register 111 may be used to set the first-type peripheral device De1, the second-type peripheral device De2, the third-type peripheral device De3, and the fourth-type peripheral device De4 to occupy the first sub-address space ARa1, the second sub-address space ARa2, the third sub-address space ARa3, and the fourth sub-address space ARa4, respectively. In some other embodiments, as shown in FIG. 4, the at least a portion of the data stored in the register 111 may be used to set that the first-type peripheral device De1, the second-type peripheral device De2, the third-type peripheral device De3, and the fourth-type peripheral device De4 to occupy the fourth sub-address space ARa4, the second sub-address space ARa2, the third sub-address space ARa3, and the first sub-address space ARa1, respectively. Because the association between the sub-address space and the corresponding peripheral device is set by the at least a portion of the data stored in the register 111, and only one address of those of the four peripheral devices is accessed at a time through the corresponding sub-interface circuit, the address range of the sub-address space does not need to be communicated to the corresponding peripheral device.

In some embodiments, the register 111 includes N groups of data bits corresponding to N sub-interface circuits, respectively. For example, the register 111 is configured to store binary numbers (0 or 1).

Figure 5:
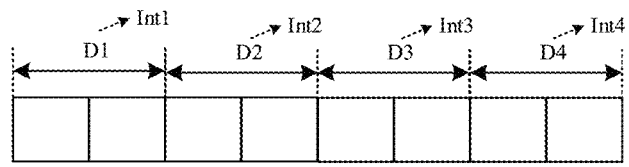
FIG. 5 illustrates a schematic diagram of a register according to some embodiments of the present disclosure.

FIG. 5 illustrates a schematic diagram of a register 111 according to some embodiments of the present disclosure. In some embodiments, as shown in FIG. 5, the N groups of data bits includes a first-group data bits D1, a second-group data bits D2, a third-group data bits D3, and a fourth-group data bits D4, that correspond to the first sub-interface circuit Int1, the second sub-interface circuit Int2, the third sub-interface circuit Int3, and the fourth sub-interface circuit Int4, respectively, and are configured to set the sub-address spaces occupied by the peripheral devices coupled with the first sub-interface circuit Int1, the second sub-interface circuit Int2, the third sub-interface circuit Int3, and the fourth sub-interface circuit Int4.

In some embodiments, each of the N groups of data bits corresponds to m data bits in the register 111, where m is a positive integer. In some embodiments, m×N is smaller than or equal to the number of data bits in the register 111. For example, as shown in FIG. 5, m=2, the first-group data bits D1 correspond to the $0^{th}$ and the $1^{st}$ data bits in the register 111. The second-group data bits D2 correspond to the $2^{nd}$ and the $3^{rd}$ data bits in the register 111. The third-group data bits D3 correspond to the $4^{th}$ and the $5^{th}$ data bits in the register 111. The fourth-group data bits D4 correspond to the $6^{th}$ and the $7^{th}$ data bits in the register 111.

In some embodiments, the N groups of data bits are used to store N m-bit binary numbers. In some embodiments, the N m-bit binary numbers stored in the N groups of data bits are different to prevent different types of peripheral devices from occupying a same sub-address space. For example, the N m-bit binary numbers correspond to N sub-address spaces. For example, the first m-bit binary number, the second m-bit binary number, the third m-bit binary number, and the fourth m-bit binary number correspond to the first sub-address space ARa1, the second sub-address space ARa2, the third sub-address space ARa3, and the fourth sub-address space ARa4, respectively. For example, the first m-bit binary number, the second m-bit binary number, the third m-bit binary number, and the fourth m-bit binary number are "00", "01", "10", and "11", respectively.

Figure 6:
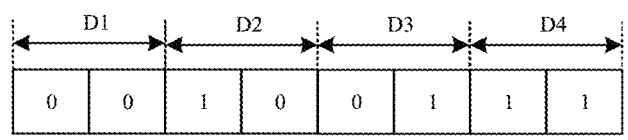
FIG. 6 and FIG. 7 illustrate a schematic diagram of data stored in the register in FIG. 5.

FIG. 6 illustrate a schematic diagram of data stored in the register in FIG. 5. In some embodiments, as shown in FIG. 6, the data stored in the register 111 is "11100100" (binary, corresponding to e4 in hexadecimal). In this case, the m-bit binary numbers stored in the first-group data bits D1, the second-group data bits D2, the third-group data bits D3, and the fourth-group data bits D4 are the first m-bit binary number "00", the second m-bit binary number "01", the third m-bit binary number "10", and the fourth m-bit binary number "11".

In some embodiments, the controller 110 is further configured to: based on the m-bit binary number stored in the kth-group data bits of the N groups of data bits, determine the sub-address space occupied by the peripheral device coupled with the kth sub-interface circuit (corresponding to the kth-group data bits) of the N sub-interface circuits, where k is a positive integer, that is smaller than or equal to N. For example, the sub-address space occupied by the peripheral device coupled to the kth sub-interface circuit is set to the sub-address space corresponding to the binary number stored in the kth-group data bits corresponding to the kth sub-interface circuit.

In some embodiments, for the data stored in the register 111 shown in FIG. 6, the controller 110 may set the sub-address space occupied by the peripheral device De1 coupled with the first sub-interface circuit Int1 to the first sub-address space ARa1 based on the first binary number "00" stored in the first-group data bits D1, set the sub-address space occupied by the peripheral device De2 coupled with the second sub-interface circuit Int2 to the second sub-address space ARa2 based on the second binary number "01" stored in the second-group data bits D2, set the sub-address space occupied by the peripheral device De3 coupled with the third sub-interface circuit Int3 to the third sub-address space ARa3 based on the third binary number "10" stored in the third-group data bits D3, and set the sub-address space occupied by the peripheral device De4 coupled with the fourth sub-interface circuit Int4 to the fourth sub-address space ARa4 based on the fourth binary number "11" stored in the fourth-group data bits D4, that is, the correspondence between the four types of peripheral devices and the four sub-address spaces, as shown in FIG. 3.

In some embodiments, the default value (e.g., the reset value) of the data stored in the register 111 may be "11100100" as shown in FIG. 6. Accordingly, the correspondence between the four types of peripheral devices and the four sub-address spaces is illustrated in FIG. 3.

Figure 7:
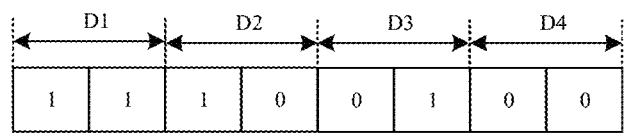

FIG. 7 illustrate a schematic diagram of data stored in the register in FIG. 5. In some embodiments, as shown in FIG. 7, the data stored in the register 111 is "00100111 (binary number, corresponding to 27 in hexadecimal). The m-bit binary numbers stored in the first-group data bits D1, the second-group data bits D2, the third-group data bits D3, and the four-group data bits D4 are the fourth m-bit binary number "11", the second m-bit binary number "01", the third m-bit binary number "10", and the first m-bit binary number "00", respectively. In this case, based on the data stored in the register 111, the controller 110 may set the sub-address space occupied by the peripheral device De1 coupled with the first sub-interface circuit Int1 to the fourth sub-address space ARa4, set the sub-address space occupied by the peripheral device De2 coupled with the second sub-interface circuit Int2 to the second sub-address space ARa2, set the sub-address space occupied by the peripheral device De3 coupled with the third sub-interface circuit Int3 to the third sub-address space ARa3, and set the sub-address space occupied by the peripheral device De4 coupled with the fourth sub-interface circuit Int4 to the first sub-address space ARa1, that is, the correspondence between the four types of peripheral devices and the four sub-address spaces, as shown in FIG. 4.

In some embodiments, the controller 110 is further configured to: based on the m-bit binary number stored in the kth-group data bits of the N groups of data bits, set the address occupied by the peripheral device coupled with the kth sub-interface circuit to the address space that belongs to the peripheral device coupled with the kth sub-interface circuit. The address occupied by the peripheral device coupled with the kth sub-interface circuit can be sent to the second interface circuit 130, or can be received from the second interface circuit 130.

In some embodiments, based on the m-bit binary number stored in the kth-group data bits of the N groups of data bits, the controller 110 may set a value of the highest pre-determined number of data bits of the address occupied by the peripheral device coupled with the kth sub-interface circuit, such that the address occupied by the peripheral device coupled with the kth sub-interface circuit belongs to the address space occupied by the peripheral device coupled with the kth sub-interface circuit.

In some embodiments, the values of the highest pre-determined numbers of data bits of the addresses corresponding to the first m-bit binary number "00", the second m-bit binary number "01", the third m-bit binary number "10", and the fourth m-bit binary number "11" are hexadecimal numbers "20", "22", "24", and "26", respectively, that is, binary numbers "00100000", "00100010", "00100100", and "00100110", respectively.

In some embodiments, based on the first m-bit binary number "00", the value of the highest two data bits of the address occupied by the peripheral device can be set to the hexadecimal number "20", such that the address occupied by the peripheral device, that is set based on the first m-bit binary number "00" belongs to the first sub-address space ARa1 (e.g., the first sub-address space ARa1 includes 0x20000000-0x20FFFFFF). Based on the second m-bit binary number "01", the value of the highest two data bits of the address occupied by the peripheral device can be set to the hexadecimal number "22", such that the address occupied by the peripheral device, that is set based on the second m-bit binary number "01" belongs to the second sub-address space ARa2 (e.g., the second sub-address space ARa2 includes 0x22000000-0x22FFFFFF). Based on the third m-bit binary number "10", the value of the highest two data bits of the address occupied by the peripheral device can be set to the hexadecimal number "24", such that the address occupied by the peripheral device, that is set based on the third m-bit binary number "10" belongs to the third sub-address space ARa3 (e.g., the third sub-address space ARa3 includes 0x24000000-0x24FFFFFF). Based on the fourth m-bit binary number "11", the value of the highest two data bits of the address occupied by the peripheral device can be set to the hexadecimal number "26", such that the address space occupied by the peripheral device, that is set based on the fourth m-bit binary number "11" belongs to the fourth sub-address space ARa4 (e.g., the fourth sub-address space ARa4 includes 0x26000000-0x26FFFFFF).

In some embodiments, the controller 110 is further configured to: receive a second address corresponding to the peripheral device coupled with the kth sub-interface circuit from the kth sub-interface circuit, and based on the m-bit binary number stored in the kth-group data bits of the N groups of data bits, convert the second address into a third address. In this case, the kth sub-interface circuit may be any one of the plurality of sub-interface circuits, and the kth-group data bits are data bits of the N groups of data bits corresponding to the kth sub-interface circuit.

In some embodiments, the second address may be an address assigned to the peripheral device by a processor of a different type from the processor where the processor interface assembly 100 is located. For example, the processor of a different type from the processor where the processor interface assembly 100 is located assigns the second address (e.g., 0xDFFFFF) to an I/O device (e.g., a mouse). During operation, the controller 110 receives the second address, converts the second address (e.g., 0xDFFFFF) to the third address (e.g., 0x20DFFFFF), and provides the third address to the second interface circuit 130.

In some embodiments, the third address is the address occupied by the peripheral device coupled with the kth sub-interface circuit, belongs to the sub-address space occupied by the peripheral device coupled with the kth sub-interface circuit, and is provided to the second interface circuit 130.

In some embodiments, the controller 110 is further configured to set the value of the highest pre-determined number of data bits for the third address based on the m-bit binary number stored in the kth-group data bits of the N groups of data bits, and to set values of remaining data bits for the third address based on the second address. For example, the third address can be obtained by adding a pre-determined number of data bits before the second address, and setting the value of the pre-determined number of data bits based on the m-bit binary number stored in the kth-group data bits of the N groups of data bits. For example, the second address corresponding to the peripheral device coupled with the kth sub-interface circuit may be 0xDFFFFF. The m-bit binary number stored in the kth-group data bits is "00". Based on the m-bit binary number "00" stored in the kth-group data bits, the third address (e.g., the address occupied by the peripheral device coupled with the kth sub-interface circuit) can be set to 0x20DFFFFF).

Figure 8:
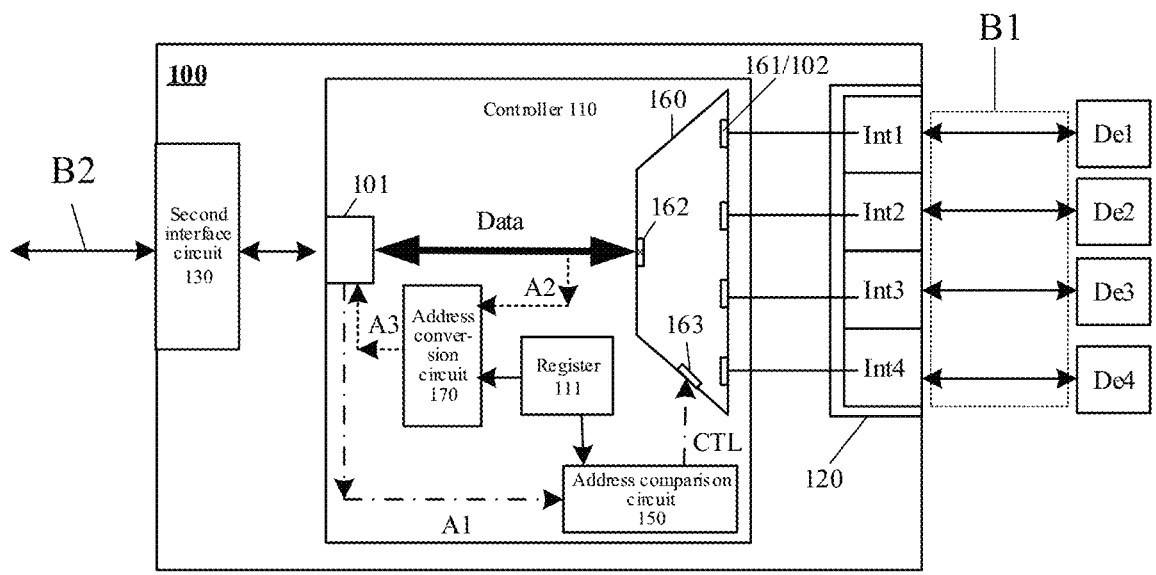
FIG. 8 illustrates a schematic block diagram of another exemplary processor interface assembly according to some embodiments of the present disclosure.

FIG. 8 illustrates a schematic block diagram of another exemplary processor interface 100 assembly according to some embodiments of the present disclosure. The conversion from the second address to the third address by the controller 110 is described further with reference to FIG. 8. In some embodiments, as shown in FIG. 8, the controller 110 further includes an address conversion circuit 170 and a first signal terminal 101. The first signal terminal 101 is configured to couple with the second interface circuit 130. A first input terminal of the address conversion circuit 170 is configured to receive the second address A2 corresponding to the peripheral device coupled with the kth sub-interface circuit.

In some embodiments, as shown in FIG. 8, the controller 110 further includes a multiplexer (also referred to as a multiplexing circuit) 160 and a plurality of second signal terminals 102. The multiplexer 160 includes a control terminal 163, a third signal terminal 162, and a plurality of fourth signal terminals 161. The third signal terminal 162 is configured to couple with the first signal terminal 101. The plurality of fourth signal terminals 161 are configured to be the plurality of second signal terminals 102 and are coupled with the plurality of sub-interface circuits (e.g., Int1 to Int4).

In some embodiments, as shown in FIG. 8, each of the plurality of sub-interface circuits is configured to receive the second address A2 from the peripheral device coupled with each of the plurality of sub-interface circuits. For example, as shown in FIG. 8, when the third signal terminal 162 is electrically connected to each of the plurality of sub-interface circuits through each of the plurality of fourth signal terminals 161, the second address A2 is transferred to the third signal terminal 162 and further to the first input terminal of the address conversion circuit 170.

In some embodiments, as shown in FIG. 8, a second input terminal of the address conversion circuit 170 is configured to receive the portion of the data (e.g., the m-bit binary number stored in the kth-group data bits) stored in the register 111 and corresponding to the kth sub-interface circuit.

In some embodiments, as shown in FIG. 8, the address conversion circuit 170 is further configured to convert the second address into the third address based on the value of the portion of the data stored in the register 111 and corresponding to the kth sub-interface circuit, and to provide the third address to the first signal terminal 101 through an output terminal of the address conversion circuit 170.

In some embodiments, the second address A2 includes x data bits (e.g., binary bits), where x is a positive integer. For example, the second address A2 may be "110111111111111111111111" (a binary number, corresponding to hexadecimal DFFFFF). The second address includes 24 data bits, that is, x=24.

In some embodiments, the address conversion circuit 170 is further configured to add z data bits (e.g., binary data bits) before the highest data bit of the second address based on the portion of the data stored in the register 111 and corresponding to the kth sub-interface circuit, and to make the values of the added z data bits all have the same pre-determined value to generate an intermediate address (also referred to as a first intermediate address), where z is a positive integer. For example, z is equal to 8 and the same pre-determined value is 1. In this case, the intermediate address generated based on the second address is "11111111110111111111111111111111" (binary number, corresponding to hexadecimal FFDFFFFF).

In some embodiments, the address conversion circuit 170 is further configured to generate the intermediate data based on the portion (e.g., the m-bit binary number stored in the kth-group data bits) of the data stored in the register 111 and corresponding to the kth sub-interface circuit. The values of lowest x data bits of the intermediate data all the same pre-determined value. For example, the number of the data bits of the intermediate data is equal to the number of the data bits of the intermediate address. For example, the highest x data bits of the intermediate data (e.g., the m pre-determined data bits among the highest x data bits) include the m-bit binary number stored in the kth-group data bits. For example, when the m-bit binary number stored in the kth-group data bits is "00", the highest z data bits of the intermediate data is "00100000". When the m-bit binary number stored in the kth-group data bits is "01", the highest z data bits of the intermediate data is "00100010". When the m-bit binary number stored in the kth-group data bits is "10", the highest z data bits of the intermediate data is "00100100". When the m-bit binary number stored in the kth-group data bits is "11", the highest z data bits of the intermediate data is "00100110".

In some embodiments, when the m-bit binary number stored in the kth-group data bits is "00", the generated intermediate data is "00100000111111111111111111111111" (binary number, corresponding to hexadecimal 20FFFFFF).

In some embodiments, the address conversion circuit 170 further includes a plurality of logic operators. A first terminal and a second terminal of the plurality of logic operators are configured to receive the intermediate address and the intermediate data, respectively. The plurality of logic operators is configured to perform logic operations on the data of the data bits corresponding to the intermediate address and the intermediate data to generate the third address and output the third address through the plurality of logic operators.

In some embodiments, when the same pre-determined value is 1, the plurality of logic operators is logic AND operators, and the plurality of logic operators is configured to perform logic AND operations on the data of the corresponding data bits of the intermediate address and the intermediate data. For example, the data obtained by performing the logic AND operation on the data "110111111111111111111111" of the low 24 data bits of the intermediate address and the data "111111111111111111111111" of the low 24 data bits of the intermediate data is the same as the data of the low 24 data bits of the intermediate address, that is, "110111111111111111111111" (binary number, corresponding to hexadecimal DFFFFF). For example, the data obtained by performing the logic AND operation on the data "11111111" of the high 8 data bits of the intermediate address and the data "00100000" of the high 8 data bits of the intermediate data is the same as the data of the high 8 data bits of the intermediate data, that is "00100000". Thus, by performing the logic AND operation on the data of the corresponding data bits of the intermediate address and the intermediate data, the generated third address is "00100000110111111111111111111111" (binary number, corresponding to hexadecimal 20DFFFFF). The third address belongs to the first sub-address space ARa1. The above logic operation is further summarized in Table 1.

TABLE 1

| Pre-determined value = 1 | High 8 data bits | Low 24 data bits |
| --- | --- | --- |
| Intermediate address (binary) | 11111111 | 110111111111111111111111 |
| Intermediate address (hex) | FF | DFFFFF |
| Logic operation | AND | AND |
| Intermediate data (binary) | 00100000 | 111111111111111111111111 |
| Intermediate data (hex) | 20 | FFFFFF |
| Third address (binary) = Intermediate address (binary) AND Intermediate data (binary) | 00100000 | 110111111111111111111111 |
| Third address (hex) | 20 | DFFFFF |

In some embodiments, when the same pre-determined value is 0, the plurality of logic operators is logic OR operators, and the plurality of logic operators is configured to perform logic OR operations on the data of the corresponding data bits of the intermediate address and the intermediate data. For example, the second address A2 is "110111111111111111111111" (binary number, corresponding to hexadecimal DFFFFF). The intermediate address generated based on the second address A2 is "00000000111111110111111111111111" (binary number, corresponding to hexadecimal 00FFDFFFFF). When the m-bit binary number stored in the kth-group data bits is "00", the generated intermediate data is "00100000000000000000000000000000" (binary number, corresponding to hexadecimal 20000000). In this case, the data obtained by performing the logic OR operation on the data of the low 24 data bits of the intermediate address and the data of the low 24 data bits of the intermediate data is the same as the data of the low 24 data bits of the intermediate data, that is, "110111111111111111111111" (binary number, corresponding to hexadecimal DFFFFF). The data obtained by performing the logic OR operation on the data "00000000" of the high 8 data bits of the intermediate address and the data "00100000" of the high 8 data bits of the intermediate data is the same as the data of the high 8 data bits of the intermediate data, that is "00100000". Thus, by performing the logic OR operation on the data of the corresponding data bits of the intermediate address and the intermediate data, the generated third address is "00100000110111111111111111111111" (binary number, corresponding to hexadecimal 20DFFFFF). The third address belongs to the first sub-address space ARa1. The above logic operation is further summarized in Table 2.

TABLE 2

| Pre-determined value = 0 | High 8 data bits | Low 24 data bits |
| --- | --- | --- |
| Second address (binary) | | 110111111111111111111111 |
| Second address (hex) | | DFFFFF |
| Intermediate address (binary) | | 00000000110111111111111111111111 |
| Intermediate address (hex) | | 00FFDFFFFF |
| m-bit binary | | 00 |
| Intermediate data (binary) | | 00100000000000000000000000000000 |
| Intermediate data (hex) | | 20000000 |
| Intermediate address (binary) | 00000000 | 110111111111111111111111 |
| Intermediate address (hex) | 00 | DFFFFF |
| Logic operation | OR | OR |
| Intermediate data (binary) | 00100000 | 110111111111111111111111 |
| Intermediate data (hex) | 20 | DFFFFF |
| Third address (binary) = Intermediate address (binary) OR Intermediate data (binary) | 00100000 | 110111111111111111111111 |
| Third address (hex) | 20 | DFFFFF |

In some embodiments, as shown in FIG. 8, the second interface circuit 130 is configured to receive the first address A1 and data associated with the first address A1 from the second bus B2, and provide the first address A1 and the data associated with eth first address A1 to the controller 110. The controller 110 is further configured to: based on the data and the first address A1 stored in the register 111, distribute the data associated with the first address A1 to some of the plurality of sub-interface circuits corresponding to the first address A1. For example, the data associated with the first address A1 may include data of used as instructions. For example, the number of the data bits (e.g., binary data bits) of the first address A1 is equal to the number of the data bits (e.g., binary data bits) of the third address A3.

In some embodiments, as shown in FIG. 8, the controller 110 further includes an address comparison circuit 150. The first signal terminal 101 of the controller 110 is configured to receive the first address A1 from the second interface circuit 130. A first input terminal of the address comparison circuit 150 is configured to couple with the first signal terminal 101 to receive the first address A1 from the first signal terminal 101.

In some embodiments, as shown in FIG. 8, a second input terminal of the address comparison circuit 150 is configured to couple with the register 111 to receive at least a portion of the data stored in the register 111 from the register 111.

In some embodiments, the address comparison circuit 150 is configured to generate a control signal CTL based on the first address A1 and at least a portion of the data stored in the register 111. For example, the address comparison circuit 150 is configured to determine the sub-interface circuit corresponding to the first address A1 by comparing the data of pre-determined data bits (e.g., the fifth and the sixth data bits) of the first address A1 with the at least a portion of the data stored in the register 111, and to generate the control signal CTL to allow the fourth signal terminal 161 that is coupled with the sub-interface circuit corresponding to the first address A1 to electrically connect to the third signal terminal 162.

In some embodiments, the group of the pre-determined data bits of the first address A1 may be sequentially compared with each group of the N m-bit binary numbers stored in the N groups of data bits, respectively, to determine which data bits of the N groups of data bits store the m-bit binary number that is equal to the data of the pre- determined data bits of the first address A1, and to further determine the sub-interface circuit corresponding to the first address A1 to be the sub-interface circuit corresponding to the data bits storing the data of the pre-determined data bits of the first address A1.

In some embodiments, the data of the fifth and the sixth data bits of the addresses 0x20FFFFFF, 0x22FFFFFF, 0x24FFFFFF, and 0x26FFFFFF are "00", "01", "10", and "11", respectively. For example, the m-bit binary numbers stored in the first-group data bits, the second-group data bits, the third-group data bits, and the fourth-group data bits are "00", "01", "10", and "11", respectively (respectively corresponding to the first sub-interface circuit Int1, the second sub-interface circuit Int2, the third sub-interface circuit Int3, and the fourth sub-interface circuit Int4). When the data of the pre-determined data bits of the first address A1 is "00", the sub-interface circuit corresponding to the first address A1 can be determined to be the first sub-interface circuit Int1 corresponding to the first-group data bits that store the binary number "00".

In some embodiments, the control terminal 163 of the multiplexer 160 is configured to couple with an output terminal of the address comparison circuit 150 to receive the control signal CTL. The third signal terminal 162 is configured to couple with the first signal terminal 101 to receive the data associated with the first address A1 from the first signal terminal 101. The multiplexer 160 is further configured to electrically connect the third signal terminal 162 with the fourth signal terminal 161 that is coupled with the sub-interface circuit corresponding to the first address A1 based on the control signal CTL to distribute the data associated with the first address A1 to the sub-interface circuit corresponding to the first address A1.

In some embodiments, the controller 110 is further configured to: convert the first address A1 into a fourth address A4, and distribute the fourth address A4 to the sub-interface circuit corresponding to the first address A1 among the plurality of sub-interface circuits. For example, the peripheral device corresponding to the first address A1 can be accessed based on the fourth address A4. For example, the number of the data bits (e.g., binary data bits) of the fourth address A4 is equal to the number of the data bits (e.g., binary data bits) of the second address A2. For example, the first address A1 can be converted into the fourth address A4 by removing or modifying the highest pre-determined number of data bits of the first address A1.

In some embodiments, the controller 110 is further configured to: associate the data associated with the first address A1 with the fourth address A4, and distribute the associated fourth address A4 and the data associated with the first address A1 to the sub-interface circuit corresponding to the first address A1 among the plurality of sub-interface circuits.

The following points need to be explained.

(1) The processor interface assembly is not limited to being applied to the LPC interface circuit, but can also be applied to other applicable interface circuits. Accordingly, types of the first bus B1 and the second bus B2 can be adjusted according to a type of the interface circuit.

(2) For the convenience of description, the method of converting the second address A2 into the third address A3 is described as an example by adding a pre-determined number of data bits before the highest data bit of the second address. However, at least one of the embodiments of the present disclosure is not limited to this method. For example, the second address A2 can also be converted into the third address A3 by adjusting the highest pre-determined number of data bits of the second address A2. The description thereof is omitted.

(3) For the convenience of description, the number of types of the plurality of peripheral devices, the number of the multiple sub-address spaces, the number of the plurality of sub-interface circuits, and the number of multiple groups of data bits all are 4 as an example for illustration. However, at least one of the embodiments of the present disclosure is not limited to this number. For example, the types and numbers of the plurality of peripheral devices can also be set to 3, 5, or other suitable values.

(4) in some embodiments, the sub-address space occupied by each type of the plurality of peripheral devices is the sub-address space that the type of the peripheral device declared to occupy. An actual size of the address space occupied by the type of the peripheral device may be smaller than the sub-address space that the type of the peripheral device declared to occupy.

In some embodiments, the type of the peripheral device corresponding to the APB interface address can be configured by setting at least a portion of the data stored in the register in the controller of the processor interface assembly. The address space allocated by the processor where the processor interface assembly is located to the peripheral device is mapped with the address space allocated by another processor to the peripheral device, such that the processor where the processor interface assembly consistent with the present disclosure is located can be compatible with programs developed on another processor platform, without the need for developers to modify the address space in the program one by one, thereby improving adaptability of the processor interface assembly.

In some embodiments, the processor interface assembly further includes a second register used in the interrupt mode. The second register includes at least one interrupt mask identification bit. For example, when an interrupt mask identification bit is set to a first value (e.g., 1), a corresponding interrupt request received from a peripheral device is masked and cannot be reported to the processor core. When the interrupt mask identification bit is set to a second value (e.g., 0), the corresponding interrupt request received from the peripheral device can be reported to the processor core. For example, the interrupt mode of the processor interface assembly includes a serial interrupt mode and a DMA interrupt mode. For example, the second register includes two interrupt mask identification bits. The high bit is the mask identification bit for a serial interrupt, and the low bit is the mask identification bit for a DMA interrupt. For example, by enabling the processor interface assembly to further include the second register for the interrupt modes, it is possible to control whether to allow an interrupt in a software manner.

The embodiments of the present disclosure may be implemented by hardware, software, firmware, or a combination thereof.

Figure 9:
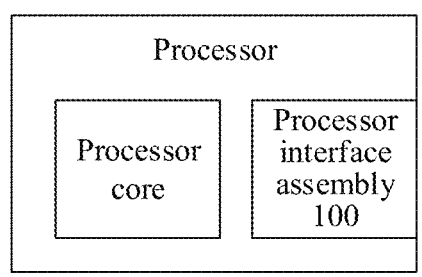
FIG. 9 illustrates a schematic diagram of an exemplary processor according to some embodiments of the present disclosure.

The present disclosure also provides a processor (e.g., a processor chip). FIG. 9 illustrates a schematic diagram of an exemplary processor according to some embodiments of the present disclosure. In some embodiments, as shown in FIG. 9, the processor includes a disclosed processor interface assembly.

In some embodiments, as shown in FIG. 9, the processor further includes a processor core. The processor core sends the first address and the data related to (e.g., associated with) the first address to the processor interface assembly. The processor interface assembly is configured to, based on the first address and the value in the register included in the processor interface assembly, transfer the data related to the first address to the sub-interface circuit corresponding to the first address, and distribute the data elated to the first address to the sub-interface circuit corresponding to first address through the first bus (e.g., LPC bus). In some embodiments, the processor interface assembly is configured to receive the second address and the data related to (e.g., associated with) the second address from the peripheral device, convert the second address into the third address, and transfer the third address and the data related to the second address to the processor core through the second bus (e.g., APB bus). In some embodiments, the processor interface assembly is further configured to associate the third address with the data related to the second address, and transfer the associated third address and the data related to the second address to the processor core through the second bus (e.g., APB bus). In some embodiments, the distribution of the data related to the first address and the conversion of the second address can be referred to the processor interface assembly, and the description thereof is omitted. In some embodiments, the processor may be compatible with the programs developed on another processor platform without the need for developers to modify the address space in the program one by one, thereby improving the adaptability of the processor interface assembly.

The present disclosure also provides an operation method for the processor interface assembly consistent with the embodiments of the present disclosure. The operation method includes: modifying at least a portion of the data stored in the register to adjust the sub-address space occupied by the at least one type of peripheral devices among the plurality of peripheral devices. In some embodiments, by modifying the at least a portion of the stat stored in the register to adjust the sub-address space occupied by the at least one type of peripheral devices among the plurality of peripheral devices, developers may avoid modifying the address space in the program one by one, thereby improving the adaptability of the processor interface assembly.

In some embodiments, the number of the plurality of sub-interface circuits and the number of the multiple sub-address spaces all are N, where N is a positive integer. The register includes the N groups of data bits corresponding to the N sub-interface circuits, respectively. Each of the N groups of data bits includes m-bit binary number in the register. The N groups of data bits are configured to store N m-bit binary numbers, respectively. The operation method further includes: making the N m-bit binary numbers stored in the N groups of data bits different from each other. For example, by making the N m-bit binary numbers stored in the N groups of data bits different from each other, it is possible to prevent different types of peripheral devices from occupying the same sub-address space.

Although general descriptions and specific implementations have been used above to describe the present disclosure in detail, some modifications or improvements can be made on the basis of the embodiments of the present disclosure, which is obvious to those skilled in the art. Therefore, these modifications or improvements made without departing from the spirit of the present disclosure all fall within the scope of protection claimed by the present disclosure.

The above descriptions are merely exemplary implementations of the present disclosure, and are not used to limit the protection scope of the present disclosure, which is determined by the appended claims.

What is claimed is:

1. An interface circuit, comprising:
    a first interface circuit including a plurality of sub-interface circuits coupled with a plurality of types of peripheral devices respectively, wherein the plurality of types of peripheral devices is configured to occupy a pre-determined address space, and the pre-determined address space includes a plurality of sub-address spaces corresponding to the plurality of types of peripheral devices respectively; and
    a controller including a register and based on at least a portion of data stored in the register, configured to communicate with at least one type of peripheral devices through a sub-interface circuit, wherein the sub-interface circuit and the at least one type of peripheral devices are electrically connected and the sub-interface circuit is determined based on a sub-address space of the at least one type of peripheral devices;
    wherein:
    the interface circuit further includes a second interface circuit;
    the controller is further configured to:
        receive a second address and data associated with the second address from a kth sub-interface circuit among the plurality of sub-interface circuits corresponding to a peripheral device coupled with the kth sub-interface circuit, wherein k is a positive integer;
        based on the at least a portion of the data stored in the register, convert the second address into a third address, wherein the third address belongs to the sub-address space occupied by the peripheral device coupled with the kth sub-interface circuit; and
        provide the third address and the data associated with the second address to the second interface circuit, and further to a processor coupled with the second interface circuit.

2. The interface circuit according to claim 1, wherein:
    the first interface circuit is coupled with the plurality of types of peripheral devices through a first bus;
    the second interface circuit is coupled with a second bus;
    the second interface circuit is configured to receive a first address and data associated with the first address from the second bus, and to provide the first address and the data associated with the first address to the controller; and
    the controller is further configured to determine the sub-interface circuit coupled with the type of peripheral devices associated with the sub-address space that includes the first address and distribute the data associated with the first address to the sub-interface circuit.

3. The interface circuit according to claim 2, wherein:
the controller further includes an address comparison circuit, a multiplexing circuit, a first signal terminal, and a plurality of second signal terminals;
the first signal terminal is coupled with the second interface circuit to receive the first address from the second interface circuit;
a first input terminal of the address comparison circuit is coupled with the first signal terminal to receive the first address from the first signal terminal;
a second input terminal of the address comparison circuit is coupled with the register to receive the at least a portion of the data stored in the register from the register;
the address comparison circuit is configured to generate a control signal based on the first address and the at least a portion of the data stored in the register;
the multiplexing circuit includes a control terminal, a third signal terminal, and a plurality of fourth signal terminals;
the control terminal is coupled with an output terminal of the address comparison circuit to receive the control signal outputted from the address comparison circuit through the output terminal;
the third signal terminal is coupled with the first signal terminal to receive the data associated with the first address from first signal terminal;
the plurality of fourth signal terminals is coupled with the plurality of sub-interface circuits through the plurality of second signal terminals; and
the multiplexing circuit is controlled by the control signal to electrically connect the third signal terminal with the fourth signal terminal that is coupled with the sub-interface circuit corresponding to the first address to distribute the data associated with the first address to the sub-interface circuit corresponding to the first address.

4. The interface circuit according to claim 1, wherein:
the controller further includes an address conversion circuit and a first signal terminal;
the first signal terminal is coupled with the second interface circuit;
a first input terminal of the address conversion circuit is configured to receive the second address;
a second input terminal of the address conversion circuit is configured to receive a portion of the data stored in the register and corresponding to the kth sub-interface circuit; and
the address conversion circuit is further configured to convert the second address into the third address based on a value of the portion of the data stored in the register and corresponding to the kth sub-interface circuit, and to provide the third address to the first signal terminal through an output terminal of the address conversion circuit.

5. The interface circuit according to claim 4, wherein:
the second address is an x-bit address, wherein x is a positive integer;
the address conversion circuit is further configured to prepend z bits to the second address based on the portion of the data stored in the register and corresponding to the kith sub-interface circuit, and to make values of the added z data bits all have a same pre-determined value to generate a first intermediate address, wherein z is a positive integer;
the address conversion circuit is further configured to generate a second intermediate address based on the portion of the data stored in the register and corresponding to the kth sub-interface circuit, wherein values of the lowest x data bits of the second intermediate address all have a same pre-determined value, and a number of the data bits of the second intermediate address is equal to a number of the data bits of the first intermediate address;
the address conversion circuit further includes a plurality of logic operators;
a first terminal and a second terminal of the plurality of logic operators are configured to receive the first intermediate address and the second intermediate address, respectively; and
the plurality of logic operators is configured to perform logic operations on data of data bits corresponding to the first intermediate address and the second intermediate address to generate the third address and output the third address through the plurality of logic operators.

6. The interface circuit according to claim 5, wherein:
the same pre-determined value is 0, and the plurality of logic operators is logic OR operators; or
the same pre-determined value is 1, and the plurality of logic operators is logic AND operators.

7. The interface circuit according to claim 1, wherein:
a number of the plurality of sub-interface circuits and a number of the multiple sub-address spaces all are N wherein N is a positive integer;
the register includes N groups of data. bits corresponding to N sub-interface circuits, respectively, each of the N groups of data bits includes an m-bit binary number in the register, and the N groups of data bits are configured to store N m-bit binary numbers, respectively, wherein in is a positive integer; and
the controller is further configured to: based on the in-bit binary number stored in kth-group data bits of the N groups of data bits, set the sub-address space occupied by a peripheral device coupled with the kth sub-interface circuit of the N sub-interface circuits, wherein k is a positive integer, that is smaller than or equal to N.

8. The interface circuit according to claim 7, wherein:
the controller is further configured to: receive a second address corresponding to the peripheral device coupled with the kth sub-interface circuit from the kth sub-interface circuit, and convert the second address into a third address based on the in-bit binary number stored in the kth-group data bits of the N groups of data bits. wherein the third address belongs to the sub-address space occupied by the peripheral device coupled with the kth sub-interface circuit.

9. The interface circuit according to claim 7, wherein:
the N m-bit binary numbers stored in the N groups of data bits are different from each other.

10. The interface circuit according to claim 7, wherein:
sizes of the plurality of sub-address spaces are not less than a maximum address space of address spaces occupied by the plurality of types of peripheral devices.

11. The interface circuit according to claim 7, wherein:
the sizes of the multiple sub-address spaces are equal to each other.

12. A processor, comprising an interface circuit, wherein the, interface circuit includes:

a first interface circuit including a plurality of sub-interface circuits and coupled with a plurality of types of peripheral devices respectively, wherein the plurality of types of peripheral devices is configured to occupy a pre-determined address space, and the pre-determined address space includes a plurality of sub-address spaces corresponding to the plurality of types of peripheral devices respectively; and a controller including a register and based on at least a portion of data stored in the register, configured to communicate with at least one type of peripheral devices through a sub-interface circuit, wherein the sub-interface circuit and the at least one type of peripheral devices are electrically connected and the sub-interface circuit is determined based on a sub-address space of the at least one type of peripheral devices;

wherein:

the interface circuit further includes a second interface circuit;

the controller is further configured to:
  receive a second address and data associated with the second address from a kth sub-interface circuit among the plurality of sub-interface circuits corresponding to a peripheral device coupled with the kth sub-interface circuit, wherein k is a positive integer;
  based on the at least a portion of the data stored in the register, convert the second address into a third address, wherein the third address belongs to the sub-address space occupied by the peripheral device coupled with the kth sub-interface circuit; and
  provide the third address and the data associated with the second address to the second interface circuit, and farther to a processor coupled with the second interface circuit.

13. The processor according to claim 12, wherein:
the first interface circuit is coupled with the plurality of types of peripheral devices through a first bus;
the second interface circuit is coupled with a second bus;
the second interface circuit is configured to receive a first address and data associated with the first address from the second bus, and to provide the first address and the data associated with the first address to the controller; and
the controller is further configured to determine the sub-interface circuit coupled with the. type of peripheral devices associated with the sub-address space that includes the first address and distribute the data associated with the first address to the sub-interface circuit.

14. The processor according to claim 13, wherein:
the controller further includes an address comparison circuit, a multiplexer, a first signal terminal, and a plurality of second signal terminals;
the first signal terminal is coupled with the second interface circuit to receive the first address from the second interface circuit;
a first input terminal of the address comparison circuit is coupled with the first signal terminal to receive the first address from the first signal terminal;
a second input terminal of the address comparison circuit is coupled with the register to receive the at least a portion of the data Stored in the register from the register,
the address comparison circuit is configured to generate a control signal based on the first address and the at least a portion of the data stored in the register;

the multiplexing circuit includes a control terminal, a third signal terminal, and a plurality of fourth signal terminals;
the control terminal is coupled with an output terminal of the address comparison circuit to receive the control signal outputted from the address comparison circuit through the output terminal;
the third signal terminal is coupled with the first signal terminal to receive the data. associated with the first address from first signal terminal;
the plurality of fourth signal terminals is configured to couple with the plurality of sub-interface circuits through the plurality of second signal terminals; and
the multiplexing circuit is controlled by the control signal to electrically connect the third signal terminal with the fourth signal terminal that is coupled with the sub-interface circuit corresponding to the first address to distribute the data associated with the first address to the, sub-interface circuit corresponding to the first address.

15. The processor according to claim 12, wherein:
the controller further includes an address conversion circuit and a first signal terminal
the first signal terminal is coupled with the second interface circuit;
a first input terminal of the address conversion circuit is configured to receive the second address;
a second input terminal of the address conversion circuit is configured to receive a portion of the data stored in the register and corresponding to the kth sub-interface circuit; and
the address conversion circuit is further configured to convert the second address into the third address based on a value of the portion of the data stored in the register and corresponding to the kth sub-interface circuit, and to provide the third address to the first signal terminal through an output terminal of the address conversion circuit.

16. The processor according to claim 15, wherein:
the second address is an x-bit address, wherein x is a positive integer;
the address conversion circuit is further configured to prepend z bits to the second address based on the portion of the data stored in the register and corresponding to the kth sub-interface circuit, and to make values of the added z data bits all have a same pre-determined value to generate a. first intermediate address, wherein z is a positive integer;
the address conversion circuit is further configured to generate a second intermediate address based on the portion of the data stored in the register and corresponding to the sub-interface circuit, wherein values of the lowest x data bits of the second intermediate address all have a same pre-determined value, and a number of the data bits of the second intermediate address is equal to a number of the data bits of the. first intermediate address;
the address conversion circuit further includes a plurality of logic operators;
a first terminal and a second terminal of the plurality of logic operators are configured to receive the first intermediate address and the second intermediate address, respectively; and
the plurality of logic operators is configured to perform logic operations on data of data bits corresponding to the first intermediate address and the second intermediate address to generate the third address and output the third, address through the plurality of logic operators.

17. An operation method of an interface circuit, comprising:
modifying at least a portion of data stored in a register to adjust a sub-address space occupied by at least one type of peripheral devices among a plurality of types of peripheral devices,
wherein the interface circuit includes:
a first interface circuit including a plurality of sub-interface circuits and coupled with the plurality of types of peripheral devices, wherein the plurality of types of peripheral devices is configured to occupy a pre-determined address space, and the pre-determined address space includes a plurality of sub-address spaces corresponding to the plurality of types of peripheral devices respectively; and
a controller including a register and based on at least a portion of data stored in the register, configured to communicate with at least one type of peripheral devices through a sub-interface circuit, wherein the sub-interface circuit and the at least one type of peripheral devices are electrically connected and the sub-interface circuit is determined based on a sub-address space of the at least one type of peripheral devices;
wherein:
the interface circuit further includes a second interface circuit;
the controller is further configured to:
receive a second address and data associated with the second address from a kth sub-interface circuit among the plurality of sub-interface circuits corresponding to a peripheral device coupled with the lab sub-interface circuit, wherein k is a positive integer;
based on the at least a portion of the data stored in the register, convert the second address into a third address, wherein the third address belongs to the sub-address space occupied by the peripheral device coupled with the kth sub-interface circuit; and
provide the third address and the data associated with the second address to the second interface circuit, and further to a processor coupled with the second interface circuit.

18. The operation method according to claim 17; wherein:
a number of the plurality of sub-interface circuits and a number of the plurality of sub-address spaces all are N, wherein N is a positive integer;
the register includes N groups of data bits corresponding to N sub-interface circuits, respectively;
each of the N groups of data bits dudes an in-bit binary number in the register, wherein in is a positive integer;
the N groups of data bits are configured to store N in-bit binary numbers, respectively; and
the operation method further includes: making the N m-bit binary numbers stored in the N groups of data bits different from each other.

* * * * *